United States Patent

Nakatani et al.

[11] Patent Number: 5,042,602
[45] Date of Patent: Aug. 27, 1991

[54] LOADER

[75] Inventors: Toshinori Nakatani; Koji Suenaga, both of Osaka, Japan

[73] Assignee: Toyo Umpanki Co., Ltd., Osaka, Japan

[21] Appl. No.: 568,890

[22] Filed: Aug. 17, 1990

[30] Foreign Application Priority Data

Aug. 18, 1989 [JP] Japan .................... 1-96862[U]

[51] Int. Cl.⁵ .............................. B60K 11/06
[52] U.S. Cl. ........................ 180/68.1; 165/41; 180/68.3; 180/68.4; 180/89.14
[58] Field of Search ......... 165/41; 123/41.49; 180/68.1, 68.4, 68.3, 89.14, 69.21

[56] References Cited

U.S. PATENT DOCUMENTS 3,866,580  2/1975  Whitehurst et al. ......... 180/68.1 X
4,606,422  8/1986  Jewett ........................ 180/68.3 X
4,696,361  9/1989  Clark et al. ................. 180/68.4
4,815,550  3/1989  Mather et al. ............... 180/68.1

FOREIGN PATENT DOCUMENTS 61-106429  7/1986  Japan.

Primary Examiner—David M. Mitchell
Assistant Examiner—Martin Gerich
Attorney, Agent, or Firm—Foley & Lardner

[57] ABSTRACT

A loader includes a liquid-cooled internal combustion engine, a radiator for cooling an engine cooling liquid, a cooling fan and a radiator for cooling a working oil all of which are accommodated within an engine room. One of both the radiators is so disposed as to face a rear maintenance opening of the engine room, and the other radiator is so disposed as to face an upper maintenance opening of the engine room. Cooling air is sucked from an air-induction port of an upper cover member and is discharged from an air-discharge port of a rear cover member after passing through the other radiator, the cooling fan, the one radiator in order.

17 Claims, 8 Drawing Sheets

FIG. 16
FIG. 17
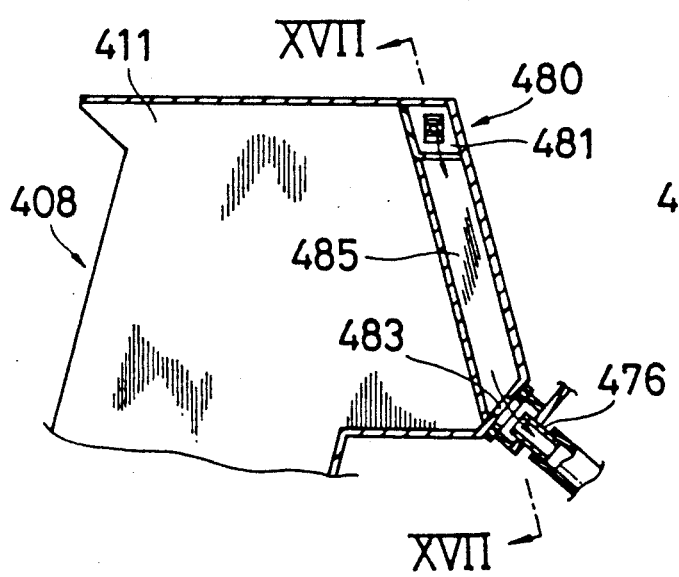
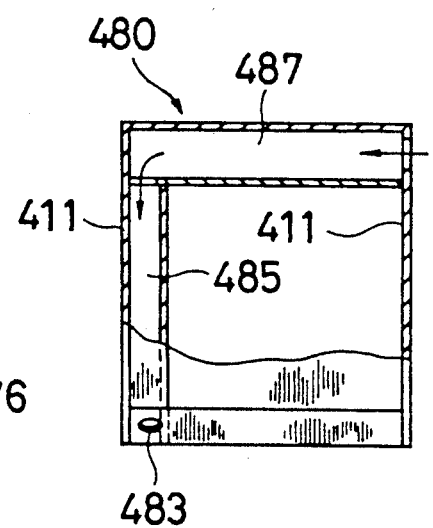

LOADER

BACKGROUND OF THE INVENTION

1. Field of the Invention

The present invention relates to a loader such as a construction loader, an agriculture loader and the like, but which has a cab and an engine room arranged in the fore and rear direction of its body, in order from the foreside, as well as a working attachment disposed in its fore space outside the body, and more specifically to a cooling system which accommodates a liquid-cooled internal combustion engine, a radiator for cooling an engine cooling liquid, a radiator for cooling a working oil and a cooling fan within the engine room and is adapted to cool both the radiators with the cooling air flow produced by the cooling fan.

2. Prior Art

As such a radiator cooling system has been known the ones disclosed in Japanese Laid Open Utility Model Publication No. 1986-106429 (refer to as a first conventional embodiment hereinafter) and in U.S. Pat. No. 4,815,550 (Mather et al.) (refer to as a second conventional embodiment hereinafter).

[FIRST CONVENTIONAL EMBODIMENT]

The followings are disclosed in the first conventional embodiment.

A deep rear door is so pivotally disposed as to open and close a rear maintenance opening on the rear side of an engine room. A radiator for cooling an engine cooling liquid and a radiator for cooling a working oil are arranged in order from the foreside within the space inside of the rear door and supported by means of the rear door. An axial fan is so disposed as to face the radiator for cooling the engine cooling liquid from the foreside. When the cooling fan is driven by an output of an engine, a cooling air delivered from the cooling fan is adapted to flow through the engine cooling liquid cooling radiator and the working oil cooling radiator in order and then to be discharged from an air discharge port of the rear panel of the rear door.

But, there are problems as described in following items (a) and (b) associated with the first conventional embodiment. (a) the rear portion of the body largely overhangs.

Since there are arranged two radiators in series, the rear door largely projects rearwards so that the rear portion of the loader body largely overhangs. Therefore, the total length of the body becomes longer by the overhanging distance.

(b) It takes much labor for carrying out a maintenance of the working oil cooling radiator.

Since the working oil cooling radiator is disposed between the engine cooling liquid cooling radiator and the rear panel of the rear door, it is difficult to visually notice a clogged condition of the radiator in case that it is clogged by foreign substances such as dusts, straw debris and the like. Therefore, the working oil tends to overheat. When the cleaning of the working oil cooling radiator is carried out, it is necessary to previously dismount the engine cooling liquid cooling radiator from the rear door. As a result, it takes much labor.

[SECOND CONVENTIONAL EMBODIMENT]

The followings are disclosed in the second conventional embodiment.

In the upper space of an engine room on the rear side of a cab there are arranged a bonnet, a working oil cooling radiator, an engine cooling liquid cooling radiator and a radial cooling fan in order from above. When the cooling fan is driven, a cooling air sucked through an air induction port of the bonnet is adapted to flow through the working oil cooling radiator and the engine cooling liquid cooling radiator in order and then to be discharged from an air discharge port of a rear door.

In this embodiment, since two radiators are disposed in the upper portion of the engine room, a thickness dimension of the rear door in the fore and rear direction can be small and advantageously it becomes possible to omit an overhang from the rear portion of a loader body. Since a worker can readily access the working oil cooling radiator from above when the bonnet is opened, advantageously the maintenance can be readily carried out. Accordingly, it is possible to solve the problems of the aforementioned items (a) and (b) of the first conventional embodiment. But, there are problems as described in following items (c) and (e) associated this embodiment.

(c) It takes much labor for carrying out the maintenance of the engine cooling liquid cooling radiator.

Since the engine cooling liquid cooling radiator is disposed in the deep portion of the engine room below the working oil cooling radiator, it is difficult to visually notice its clogged condition in case that it is clogged by foreign substances. Therefore, the engine cooling liquid tends to overheat. When the engine cooling liquid cooling radiator is cleaned, it is necessary to previously dismount the working oil cooling radiator from the body. As a result, it takes much labor.

(d) A noise level within the cab is large.

Since the cab is disposed adjacent to the cooling fan positioned within the rear space thereof, hurtling noises generated by the fan blades are apt to be transmitted thereto. The noise level can't help becoming larger by that Therefore, there is still some room for improvement, namely for improving the comfortable ride in the loader.

(e) The rearward field of vision from the cab is not good.

Since the two radiators and the cooling fan are arranged in a pile above the engine, the upper portion of the engine room can't help projecting upward. Therefore, the rearward field of vision from the cab becomes bad.

SUMMARY OF THE INVENTION

It is a first object of the present invention to solve all the problems of the aforementioned respective conventional embodiments, namely to decrease an overhang of the rear portion of the loader body, to facilitate the maintenances of two radiators, to lower the noise level within the cab and to improve the rearward field of vision from the cab.

It is a second object of the present invention to make the lowering of the noise level within the cab by reduction of an intake noise in the engine compatible with the compacting of the engine room.

It is a third object of the present invention to facilitate both maintenances of various machines and appliances accommodated within an engine room and maintenances of various machines and appliances accommodated within a hydraulic transmission room in the case that the loader is of the skid steer type.

For accomplishing the above-mentioned respective objects, the loader according to the present invention is constructed as follows.

<FIRST INVENTION>

For accomplishing the first object, the first invention is constructed as follows.

A liquid-cooled internal combustion engine, a first radiator for cooling a engine cooling liquid, a cooling fan, a fan driving means and a second radiator for cooling a working oil are accommodated within an engine room partitioned from an outside space by means of an engine room wall. An upper maintenance opening is formed in the upper portion of the engine room wall, and a rear maintenance opening is formed in the rear portion thereof. The upper maintenance opening is so covered as to be opened and closed by an upper cover member provided with an air induction port. The rear opening is so covered as to be opened and closed by a rear cover member provided with an air discharge port. One of both radiators is so disposed as to face the rear maintenance opening, and the other thereof is so disposed as to face the upper maintenance opening. By operating the cooling fan by means of the fan driving means, the air within the upper portion of the engine room is sucked into the engine room through the air induction port so as to pass along the other radiator, the cooling fan and one radiator in order and is finally discharge outside the engine room from the air discharge port of the rear cover member.

According to this construction, the following advantages can be provided.

(a) An overhang of the rear portion of the loader body is small.

Since at least one of two radiators is not disposed within the space inside of the rear cover member, the thickness dimension of the rear cover member in the fore and rear direction can be small by that portion. Therefore, an overhang of the rear portion of the loader body can be small and the total length of the body can be shortened.

(b) Since a worker can readily access one of two radiators from the rear side when the rear cover is opened, the maintenance can be readily carried out.

(c) Since a worker can readily access the other radiator from above when the upper cover member is opened, the maintenance can be readily carried out.

(d) A noise level within the cab is small.

It becomes possible to dispose the cooling fan at a position remote from the cab. Therefore, hurtling noises generated by the fan blades become hardly transmittable to the cab so that the noise level is lowered by that portion. As a result, the comfortable ride in the loader is improved.

(e) The rearward field of vision from the cab is good.

Since only one radiator of the two is disposed above the engine, the engine room projects upward only a small distance. As a result, the rearward field of vision from the cab is improved.

Incidentally, in the first invention, in the case that the first radiator for cooling the engine cooling liquid is so disposed as to face the rear maintenance opening and the second radiator for cooling the working oil is so disposed as to face the upper maintenance opening, the following advantage can be provided. That is, since a fresh outside air is supplied to the second radiator, the cooling efficiency is high and it is possible to make the radiator smaller in dimension.

Further, in the above-mentioned construction, in the case that the second radiator is fixedly secured to the upper cover member, since the upper maintenance opening is opened when the upper cover member is opened so that a worker can access the engine from above, the maintenance of the engine becomes easy.

<SECOND INVENTION>

For accomplishing the aforementioned second object, the second invention is constructed as follows.

A cab disposed in the foreside portion of the loader body is so supported by the body as to be changed over between a driving position in which the cab is pivoted forward and downward and a maintenance position in which the cab is pivoted backward and upward. An engine room disposed in the rear portion of the body is partitioned from the outside space by means of an engine room wall and accommodates a liquid-cooled internal combustion engine, a first radiator for cooling an engine cooling liquid and an air cleaner. A fore maintenance opening is formed in the fore wall portion of the engine room. The fore maintenance opening is so covered as to be opened and closed by means of a rear wall member of the cab. An air induction pipe of the air cleaner is fixedly secured at its inlet portion to the body. An intake muffler to be connected to the air cleaner is fixedly secured to a pivoting portion of the cab. When the cab is changed over to the driving position on the fore and down side, the intake muffler is air-tightly connected at its outlet portion with the inlet portion of the air induction pipe so as to intercommunicate with each other. On the other hand, when the cab is changed over to the maintenance position on the rear and upper side, the intercommunication between the outlet portion of the intake muffler and the inlet portion of the air induction pipe is cancelled.

According to this construction, the following advantages can be provided.

Since the fore maintenance opening of the engine room is opened by changing over the cab to the maintenance position, a worker can access the engine room from the foreside. Therefore, the maintenances of various machine and appliances accommodated within the engine room can be readily carried out.

Further, since the intake muffler for reducing the intake noise of the engine is disposed in the space outside the engine room, it becomes possible to make the remarkable reduction of the intake noise by provision of the muffling chamber having a large capacity compatible with the compaction of the engine room.

<THIRD INVENTION>

For accomplishing the aforementioned third object, the third invention is constructed as follows.

A loader is of the skid steer type. A cab is disposed in the foreside portion of a loader body, and an engine room is disposed in the rear portion thereof. A hydraulic transmission room is disposed in the space below the cab. The cab is provided with a lower surface member, a rear surface member and a seat to be fixedly secured to the lower surface member and is so supported as to be changed over between the driving position in which it is pivoted forward and downward and the maintenance position in which it is pivoted rearward and upward.

In the engine room partitioned from the outside space by means of an engine room wall there are provided a liquid-cooled internal combustion engine, a first radiator for cooling an engine cooling liquid, a cooling fan, a fan driving means and a second radiator for cooling a working oil. An upper maintenance opening formed in the upper portion of the engine room wall is so covered as to be opened and closed by means of an upper cover member. A rear maintenance opening formed in the rear portion of the engine room wall is so covered as to be opened and closed by means of a rear cover member. A fore maintenance opening formed in the fore portion of the engine room wall is so covered as to be opened and closed by means of a rear surface member of the cab. A maintenance opening for the hydraulic transmission room partitioned from the outside space by means of a transmission room wall is formed at least in the upper portion of the transmission room wall and is so covered as to be opened and closed by means of the lower surface member of the cab.

According to the construction as mentioned above, the following advantages can be provided.

When the upper cover member and the rear cover member are opened, a worker can access the engine room both from above and from rear side. Further, when the cab is changed over to the maintenance position, a worker can access the engine room from foreside and can access the hydraulic transmission room from above. Therefore, various machines and appliances accomodated within the engine room as well as various machines and appliances accommodated within the hydraulic transmission room can be readily maintained.

BRIEF DESCRIPTION OF THE DRAWINGS

FIG. 1 is a perspective view of a loader;

FIG. 2 is a side view of the loader;

FIG. 3 is a back view of the loader;

FIG. 4 is a vertical sectional side view of a principal portion of the loader;

FIG. 5 is a horizontal sectional plan view of a principal portion of the loader;

FIG. 6 is a sectional view along VI—VI directed line in FIG. 4;

FIG. 7 is a partial plan view of the rear portion of the loader;

FIG. 8 is a sectional view along VIII—VIII directed line in FIG. 4;

FIG. 9 is a view showing a maintenance position of the loader corresponding to FIG. 4;

FIG. 10 is a perspective view of a schematic construction of the loader body;

FIGS. 11 through 17 show a plurality of variants of the aforementioned embodiment;

FIGS. 11 and 12 shows a first variant;

FIG. 11 is a partial view corresponding to FIG. 4 and a vertical sectional side view of the rear portion of the loader;

FIG. 12 is a partial sectional plan view of FIG. 11;

FIGS. 13 through 15 show a second variant;

FIG. 13 is a view corresponding to FIG. 4;

FIG. 14 a perspective view of the rear portion of a cab;

FIG. 15 is a sectional view along XV—XV directed line in FIG. 13;

FIGS. 16 and 17 show a third variant;

FIG. 16 is a partial view corresponding to FIG. 13; and

FIG. 17 is a sectional view along XVII—XVII directed line in FIG. 16.

DESCRIPTION OF THE PREFERRED EMBODIMENTS

FIGS. 1 through 10 show one embodiment of the present invention.

In this embodiment, the present invention is applied to a skid steer loader shown in the aforementioned U.S. Pat No. 4,815,550.

Figure 1:
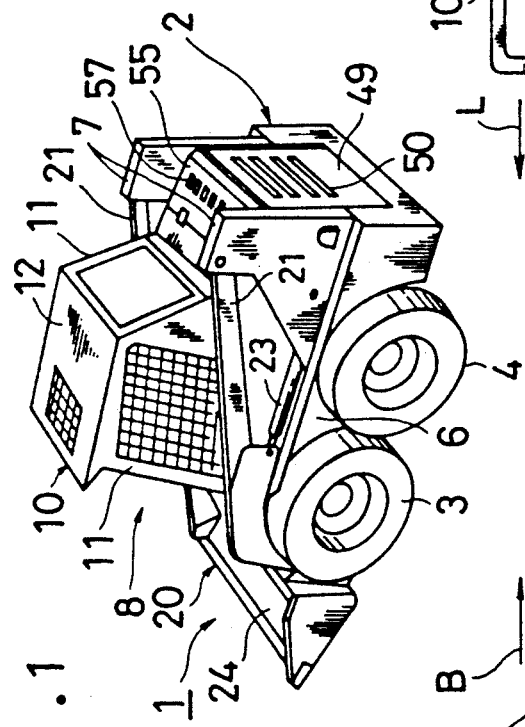
FIGS. 1 through 10 show one embodiment of the present invention.
Figure 3:
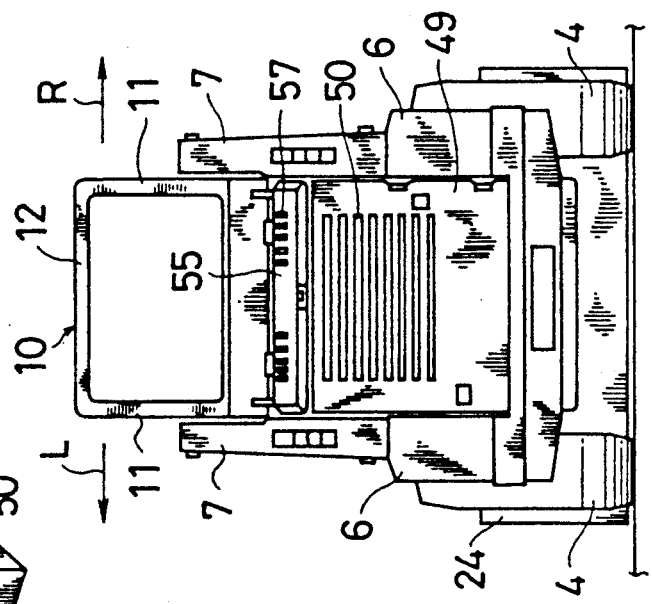
Figure 2:
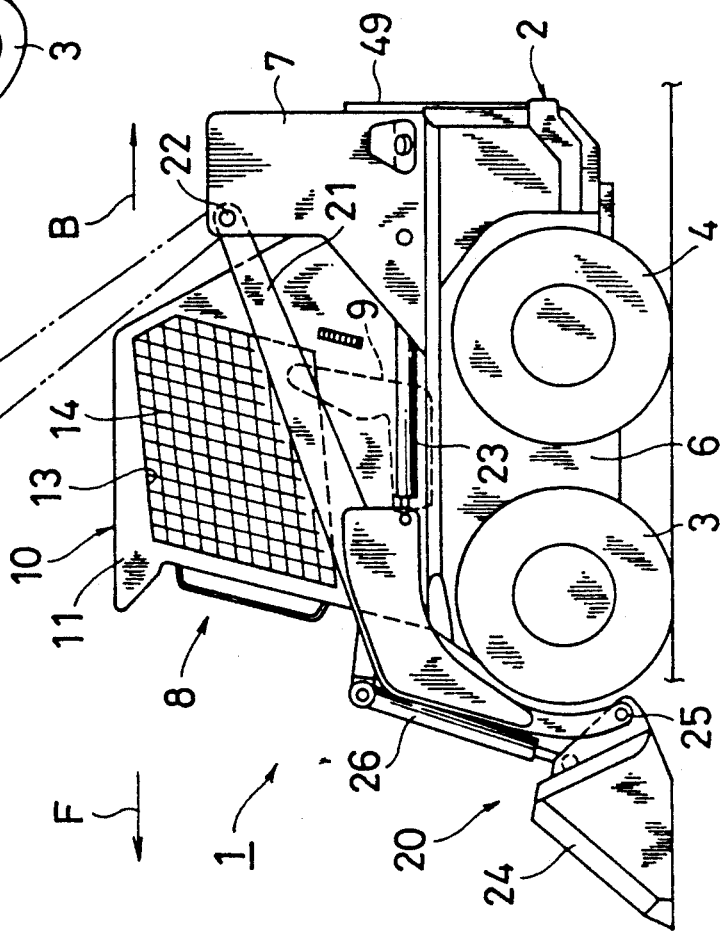

Firstly, an outline of the skid steer load will be explained with reference to FIGS. 1 through 3.

The skid steer loader 1 comprises a body 2 supported by a pair of front wheels 3, 3 and a pair of rear wheels 4, 4. In the drawings, the symbols F and B designate a foreside and a rear side respectively, and the symbols L and R disignate a left side and a rignt side with respect to the advancing direction respectively.

Figure 10:
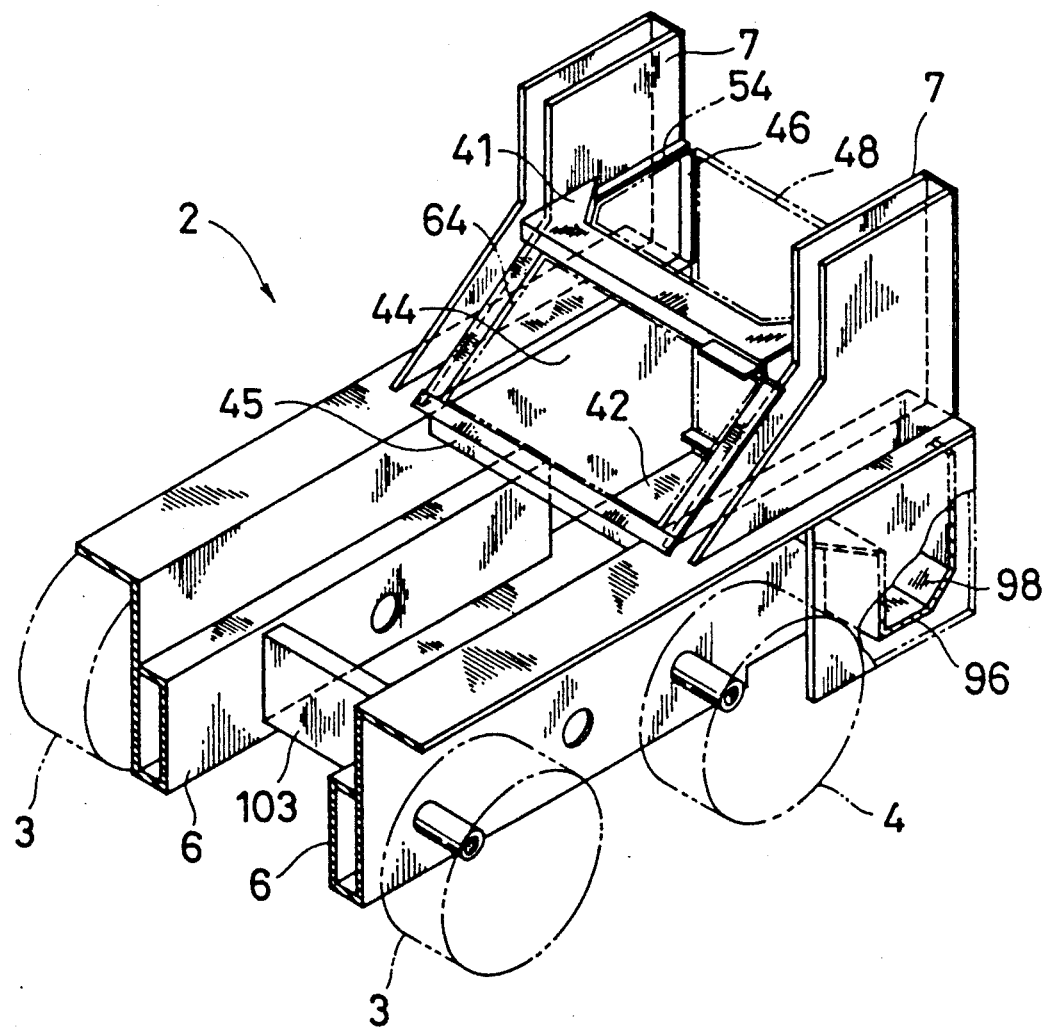

The body 2 comprises a pair of left and right main frames 6, 6 and boom-supporting frames 7, 7 projected upward from the rear portions of the respective main frames 6, 6 (refer to FIG. 10). A cab 8 is disposed in the space between both the main frames 6, 6 on the foreside of the body 2. The cab 8 is provided with a driver seat 9 and a head guard 10 covering the seat 9. The head guard 10 comprises left and right guard members 11, 11 and a ceiling member 12, and its full front portion and its rear upper portion are openable. A window 13 of each guard member 11 is covered with a wire gauze 14. An engine room 16 (herein, not illustrated) is formed in the rear portion of the body 2 so as to cover both the space between the respective rear portions of the paired main frames 6, 6 and the space between the paired boom-supporting frames 7, 7. When a rear cover member 49 and an upper cover member 55 are opened as well as the cab 8 is pivoted to the maintenance position on the rear upper side at the time of maintenance, the engine room 16 is adapted to allow various machines and appliances therewithin readily to be accessed.

A hydraulic working device 20 is constructed as follows.

Booms 21, 21 are supported at their rear ends by the upper portions of the respective boom-supporting frames 7, 7 through pivot pins 22, 22 and are adapted to be actuated by means of hydraulic cylinders 23, 23 so as to be vertically raised and lowered. A bucket 24 as a working attachment is supported by the front portions of the booms 21 through pivot pins 25, 25 and is actuated by means of hydraulic cylinders 26, 26 so as to be vertically pivoted. Thereby, the bucket 24 is supported in such a manner as forward projecting in front of the body 2.

Then, the construction of the cab 8 and the inner construction of the body 2 will be explained with reference to FIGS. 4 through 10.

Figure 4:
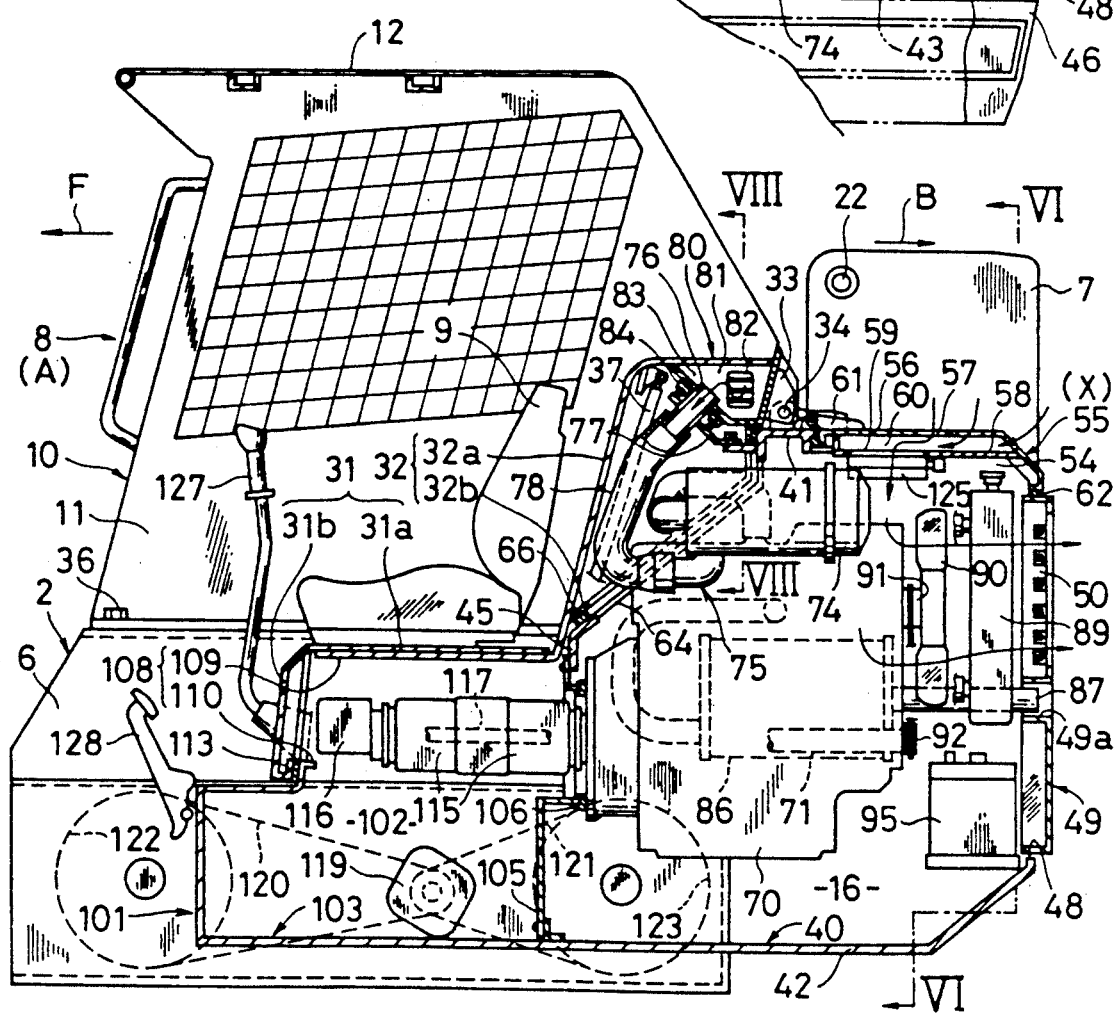
Figure 9:
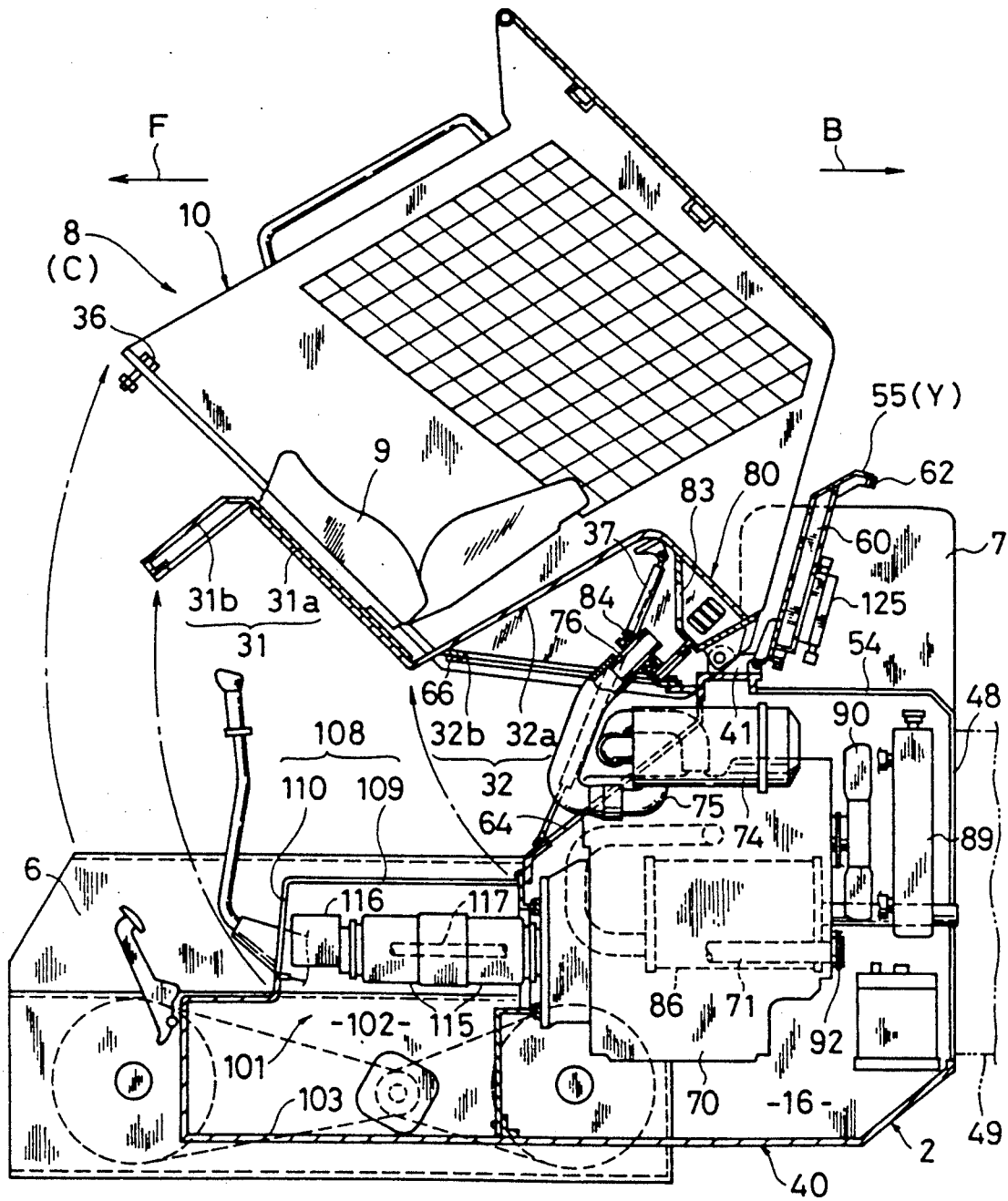

As shown in the respective side views of FIGS. 4 and 9, the cab 8 comprises a lower surface member 31 provided with a lower surface plate 31a and a rear surface member 32 provided with a reversed-L shaped rear surface plate 32a which are fixedly secured between the left and right guard members 11, 11 and has the seat 9 fixed to the upper surface of the lower surface plate 31a. Further, the cab 8 is vertically pivotally supported at its rear pivoted portions 33, 33 by the body 2 through pivot pins 34, 34 so as to be able to be changed over between the driving position A (refer to FIG. 4 ) in which it is fixedly secured to the body 2 by means of a fixing member 36 in the forward-pivoted state and the maintenance position C (refer to FIG. 9) in which it is pivoted to the rear upper side after cancellation of the secured condition of the fixing member 36. The cab 8 is held in the maintenance position C by means of extended gas cylinder 37.

Figure 5:
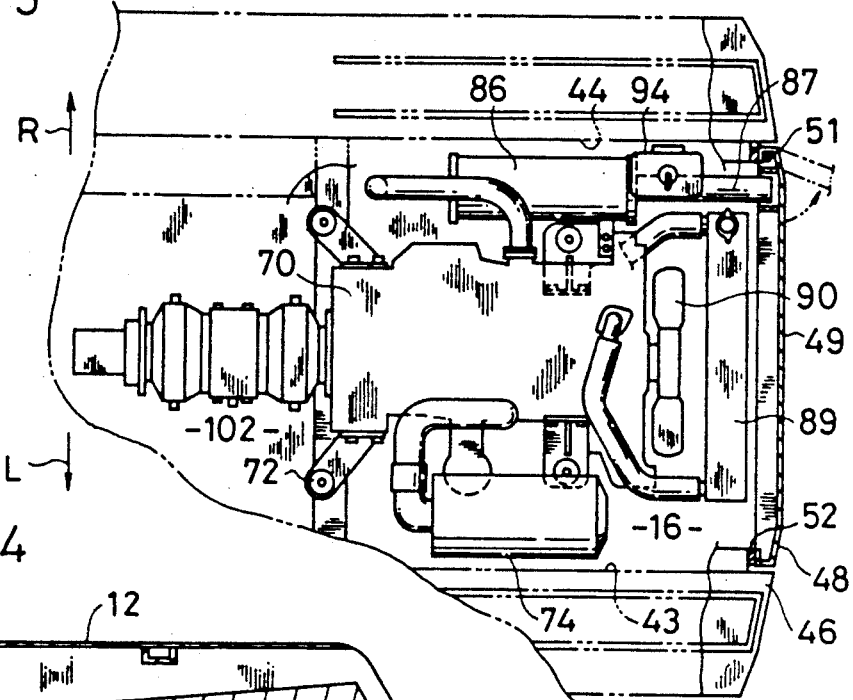
Figure 7:
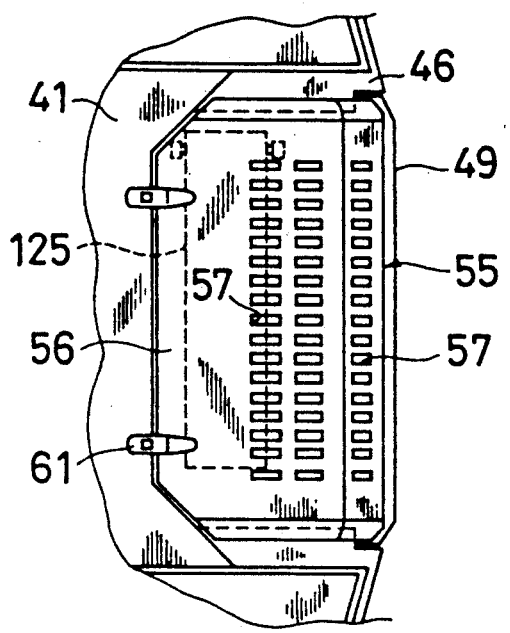
Figure 6:
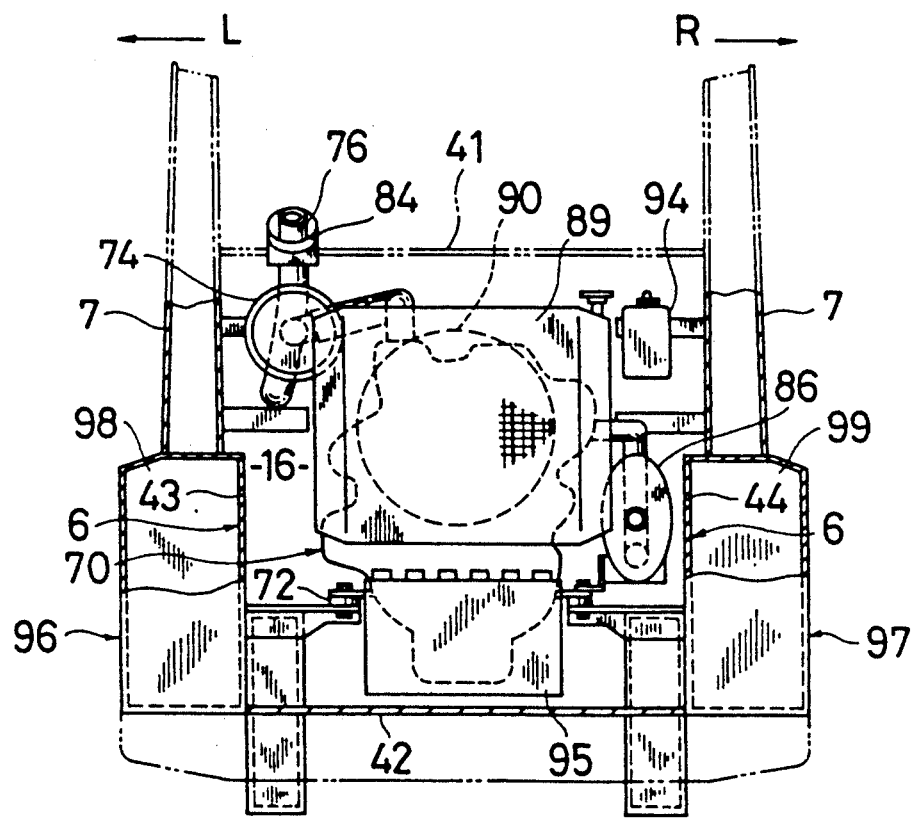

When referring to FIGS. 5, 6 and 7 in addition to FIGS. 4, 9 and 10, an engine room wall 40 which partitions the engine room 16 from the outside space comprises an upper wall portion 41, a lower wall portion 42, a left wall portion 43, a right wall portion 44, a fore wall portion 45 and a rear wall portion 46.

A rear maintenance opening 48 formed in the rear wall portion 46 is so covered as to be opened and closed by means of the rear cover member 49 provided with a plurality of slit-like air-discharge ports 50. The rear cover member 49 is supported by the right side of the rear wall portion 46 through a hinge 51 pivotally in the fore and rear direction and is adapted to be brought into air-tight contact with the peripheral edge of the rear maintenance opening 48 through a gasket 52.

An upper maintenance opening 54 formed in the upper wall portion 41 is so covered as to be opened and closed by means of the upper cover member 55. The upper cover member 55 comprises an upper surface plate 56 provided with a plurality of slit-like air-induction ports 57 and a lower surface plate 58 provided with a rectangular through-hole 59 and has a sound-absorbing chamber 60 formed between both these plates 56, 58. The upper surface plate 56 is vertically pivotally mounted at its fore portion to the upper wall portion 41 through a hinge 61 and is adapted to be brought into air-tight contact with the peripheral edge of the upper maintenance opening 54 through a gasket 62. A sound-absorbing material (not illustrated) is attached to the inner surrounding surfaces of the upper surface plate 56 and the lower surface plate 58.

A fore maintenance opening 64 is formed in the fore wall portion 45 in the inclined and forward facing manner and is so covered as to be opened an closed by means of a cover plate 32b fixedly secured to the rear side of the rear surface plate 32a of the cab 8. The rear surface plate 32 of the cab 8 is composed of both theses plates 32a, 32b. The cover plate 32b is adapted to be brought into air-tight contact with the peripheral edge of the fore maintenance opening 64 through a gasket 66.

In the foreside around the center portion of the engine room 16 in the left and right direction there is provided a liquid-cooled vertical diesel engine 70 whose crankshaft 71 extends in the fore and rear direction. The engine 70 is supported by the engine room wall 40 through four pieces of vibro-isolating rubbers 72.

Figure 8:
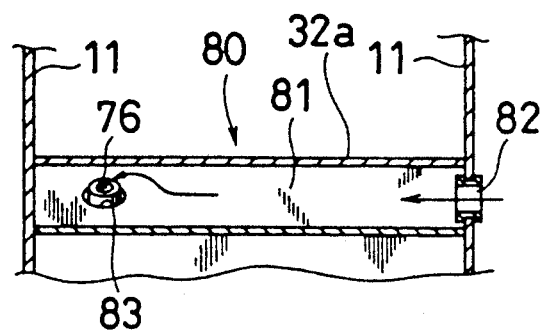

An air cleaner 74 is disposed in the upper portion of the left space outside the engine 70 so as to extend in the fore and rear direction. A connection pipe 76 as an inlet portion of an air induction pipe 75 of the air cleaner 74 is fixedly secured to the upper wall portion 41 of the engine room wall 40 by means of a bracket 77. The connection pipe 76 and the air cleaner 74 are connected to each other by means of a rubber hose 78. A resonance type intake muffler 80 is fixedly secured to the upper side of the cover plate 32b on the foreside of the pivoted portion 33 of the cab 8 corresponding to the connection pipe 76. As shown in FIGS. 4 and 8, the intake muffler 80 comprises the muffling chamber 81 having a trapezoidal cross section, a louver type inlet portion 82 formed in the right wall of the chamber and a round outlet portion 83 formed in the fore wall thereof intercommunicated with each other. As shown in FIG. 4, when the cab 8 is changed over to the driving position A, the outlet portion 83 of the intake muffler 80 is airtightly connected in communication with the connection pipe 76 through a gasket 84. On the contrary, as shown in FIG. 9, when the cab 8 is changed over to the maintenance position C, the communication between the outlet portion 83 of the intake muffler 80 and the connection pipe 76 is cancelled. Since the intake muffler 80 is disposed outside the engine room 16, it can have a large capacity easily. As a result, the intake noise can be sufficiently reduced.

An exhaust muffler 86 is disposed in a midway height portion of the right space outside the engine 70 so as to extend in the fore and rear direction and is supported by the engine 70. A discharge portion of a muffler exhaust pipe 87 at its rear end is inserted into a through hole 49a of the rear cover member 49.

On the rear side of the engine 70 there are provide a first radiator 89 for cooling an engine cooling liquid and an axial cooling fan 90 in order from rear side. The first radiator 89 is so disposed as to face the rear maintenance opening 48. A forward projecting input shaft 91 of the cooling fan 90 is interlocking connected to the rear portion of the crankshaft 71 of the engine 70 through a wrapping connector type fan driving means 92 (herein, a belt transmission means).

On the other hand, a make-up tank 94 for the engine cooling liquid is disposed on the right upper side of the first radiator 89, and a battery 95 is disposed on the lower side of the first radiator 89. Further, a fuel tank 96 and a working oil tank 97 are disposed on both the right and left sides of the engine room 16 respectively. That is, liquid-tight space 98, 99 are formed outside the respective rear portions of both the main frames 6, 6 in the right and left direction respectively so that an engine fuel can be stored in the left liquid-tight space 98 and a working oil for a hydraulic working device 20 and a hydraulic transmission 101 can be stored in the right liquid-tight space 99.

A hydraulic transmission room 102 is disposed in the space between the fore portions of both the main frames 6. 6 and below the cab 8 and is partitioned from the outside space by means of a transmission room wall 103. The hydraulic transmission room 102 and the engine room 16 are air-tightly partitioned by means of a removable partition wall 105 through a gasket 106. A maintenance opening 108 of the hydraulic transmission room 102 comprises an upper opening 109 and a fore opening 110 formed in the transmission room wall 103. Both these openings 109, 110 are so covered as to be opened and closed by means of the lower surface plate 31a of the cab 8 and the cover plate 31b projected from the fore portion of the lower surface plate 31a. Both these plates 31a, 31b are brought into air-tight contact with the peripheral edge of the maintenance opening 108 through a gasket 113.

In the hydraulic transmission room 102 there are provided two hydraulic pumps 115, 115 for moving the loader 1 and one working hydraulic pump 116 in order from behind. These hydraulic pumps are positive displacement ones and have a common input shaft 117 projecting rearward so as to be interlockingly connected to the fore portion of the crankshaft 71. Two, left and right hydraulic motors 119, 119 for moving the loader 1 (herein, only right motor 119 is illustrated) are disposed below the hydraulic pumps 115, 115, and the respective hydraulic motors 119 are adapted to rotatively drive fore and rear sprocket wheels 122, 123 for driving tired wheels 3, 4 through fore and rear chains 120, 121.

A portion of the working oil delivered from the respective hydraulic pump 115, 115, 116 is adapted to be returned to a working oil reservoir 97 via a second radiator 125 for cooling the working oil. The second radiator 125 comprises a large number of U-shaped tubes and corrugated fins attached to the surfaces of the tubes and is disposed in the upper space behind the engine 70 so as to face the upper maintenance opening 54. It is fixedly secured to the lower surface plate 58 of the upper cover member 55.

Incidentally, two maneuvering levers 127 for moving the loader and two pedals 128 for operating the hydraulic working device (herein, only right lever and right pedal are illustrated) are mounted to the body 2 at the left and right foreside positions of the hydraulic transmission room 102.

According to the above construction, during operation of the loader 1, the atmosphere is induced into the air cleaner 74 via the following route.

As shown in FIGS. 4 and 8, when the engine 70 is operated, the atmosphere on the right outside of the head guard 10 is sucked into the muffling chamber 81 which extends largely from the inlet portion 82 of the intake muffler 80 in the left and right direction. It is muffled while passing therethrough and then is induced into the air-cleaner 74 through the connection pipe 76 and the rubber hose 78 in order.

Both the radiators 89, 125 are adapted to be air-cooled as follows.

As shown in FIG. 4, when the cooling fan 90 is operated by the fan driving means 92 as the engine 70 is operated, the atmosphere on the upper outside of the engine room 16 is sucked into the sound-absorbing chamber 60 from the air-induction port 57 of the upper cover member 55 so as to cool the second radiator 125 while flowing from there into the engine room 16 via the through-hole 59 of the lower surface plate 58. Subsequently, the air flown into the engine room 16 serves to cool the first radiator 89 while being discharged rearward by the cooling fan 90 and is discharged behind the body 2 throug the discharge port 50 of the rear cover member 49. In this case, since the air in the upper space of the engine room 16 is discharged together with the above-mentioned cooling air flow through the air-discharge port 50, the upper space of the engine room 16 can be prevented from being excessively heated by the radiation heat from the engine 70. Thereby, the cab 8 is hardly subject to the heating from the engine room 16 so as to improve a comfortable ride.

Through noises of the engine are apt to be discharged upward from the engine room 16 through the air-induction ports 57, noise energy is remarkably reduced by means of bent passages and sound-absorbing material while the sound transmitting through the air passes through the sound-absorbing chamber 60.

Further, the upper portion of the boom-supporting frame 7 is extended rearward from the pivot portion of the boom pivot pin 22 to the upside of the rear end position of the upper cover member 55. Thereby, the engine noise is prevented from being discharged to the left and right space outside the body 2 from the air induction port 57.

Incidentally, when comparing with the noise levels of the A-characteristic between the loader manufactured according to the second conventional embodiment (U.S. Pat. No. 4,815,550) and the loader 1 manufactured by way of trial according to the present invention, the measurement results are as follows. The noise level at the ear position of a driver taking the seat was at 89 dB in the second conventional embodiment and at 82 dB in the present invention. Thereupon, it could be reduced by as much as 7 dB. Mean value of the noise levels at four positions 7 m away from the respective fore, rear, left and right surfaces of the loader body in the horizontal direction was at 74 dB in the second conventional embodiment and at 68 dB in the present invention. Thereupon, it could be reduced by as much as 6 dB.

As noted above, since the loader 1 is capable of reducing noises during its movement and its working, the comfortable ride within the cab 8 is improved by reduction of the noise level as well as it becomes possible to carry out a night working even around a dwelling spot requiring quiet circumstances.

At the time of maintenance, the above-mentioned loader 1 is operated as shown in FIG. 9.

Firstly, the upper cover member 55 is pivoted upward so as to be held in its open position Y by means of a gas cylinder (not illustrated). Thereby, a worker can readily access the lower surface of the second radiator 125 from behind so that a visual checking of a clogging condition caused by foreign substances such as dusts and dirts and a cleaning of a heat transfer surface by means of an air-blow can be carried out. Further, when the upper maintenance opening is opened, a replacement of an element of the air cleaner 74 and a make-up of the cooling liquid of the first radiator 89 can be done.

Then, when the rear cover 49 is opened, the rear maintenance opening 48 is opened. Thereby, a worker can readily access the rear surface of the first radiator 89 from behind so that the visual checking of a clogging condition caused by foreign substances such as dusts and dirts and the cleaning of the heat transfer surface by means of the air-blow can be carried out. When the first radiator 89 is demounted from the main frames 6, 6, the fan driving means 92 and the rear portion of the engine 70 can be readily maintained.

Further, when the cab 8 is pivoted to the maintenance position C on the rear upper side, the fore maintenance opening 64 of the engine room wall 40 is opened so that the fore portion of the engine 70 can be readily maintained as well as the maintenance opening 108 of the transmission room wall 103 is opened so that the hydraulic transmission 101 can be readily maintained.

FIGS. 11 through 17 show a plurality of variants. In the respective variants, a component member having the same construction as that in the above-mentioned embodiments is designated by the same symbol in principle.

<FIRST VARIANT>

Figure 12:
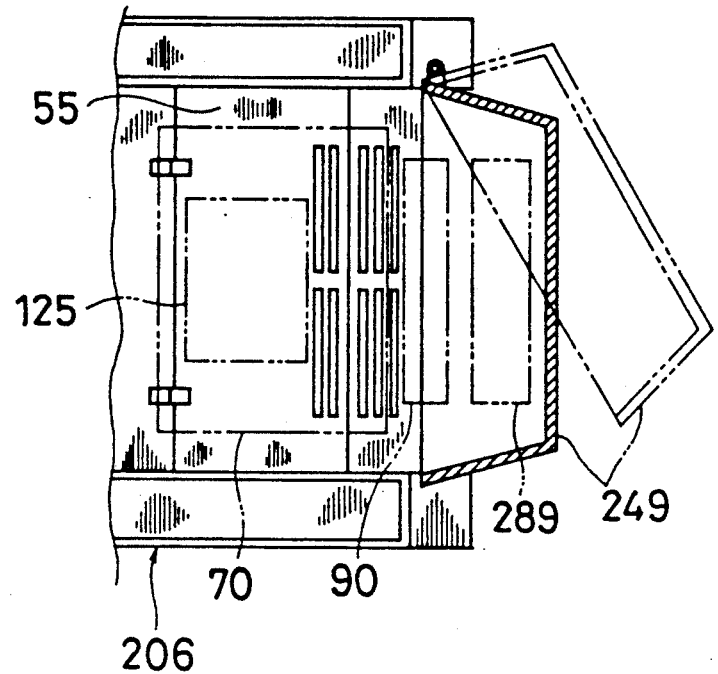
Figure 11:
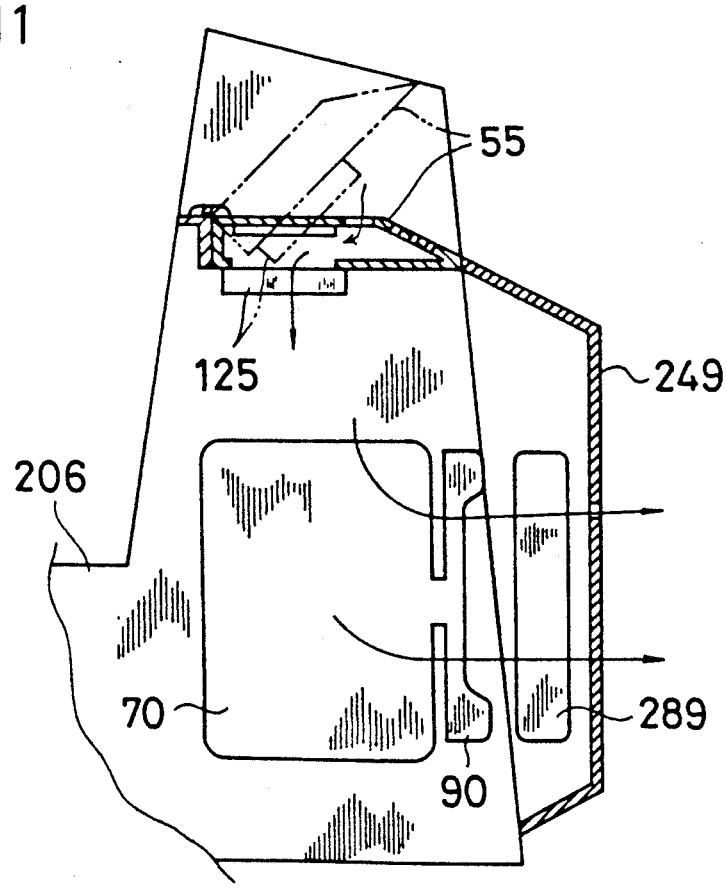

FIGS. 11 and 12 show a first variant. A rear cover member 249 is so formed as to deep project rearward and accommodates a first radiator 289 within its inner space. The first radiator 189 is supported by main frames 206 through brackets (not illustrated).

By the way, the aforementioned first radiator may be supported by a rear cover member 249 instead of the main frames 206. In this case, when the rear cover member 249 is opened, a worker can access the foreside of the radiator.

<SECOND VARIANT>

Figure 15:
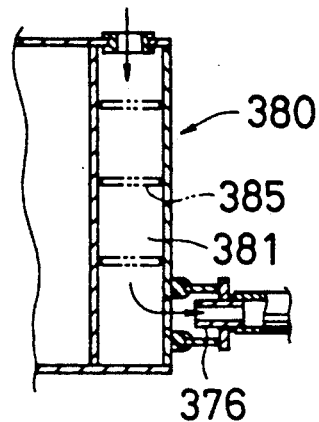
Figure 14:
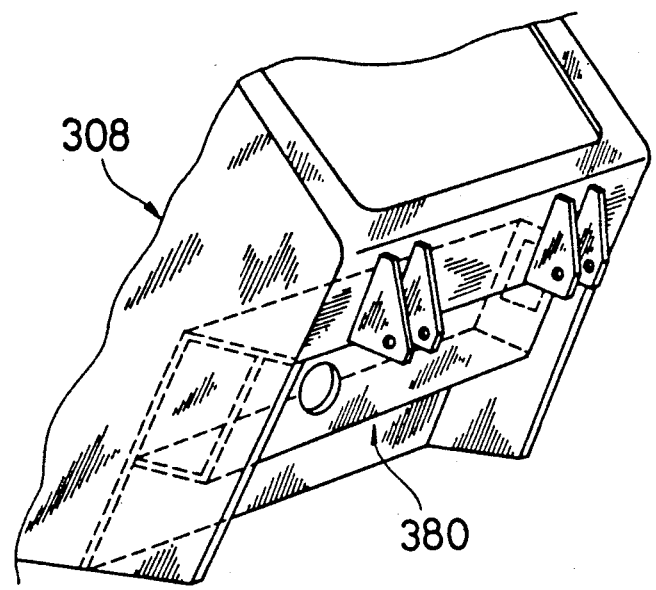
Figure 13:
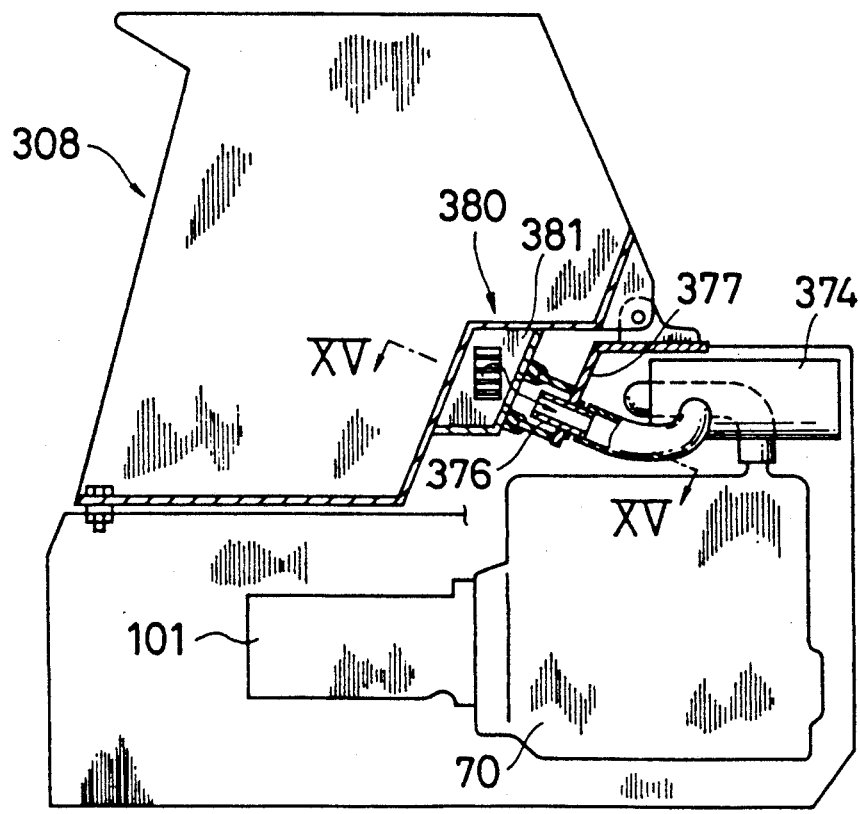

FIGS. 13 through 15 show a second variant.

A connection pipe 376 for an air cleaner 374 is fixedly secured to a bracket 377 in the forward upward opened state, and an intake muffler 380 is fixedly secured to the rear and lower portion of a cab 308. Incidentally, it is preferable that a plurality of baffle plates 385 are arranged within a muffling chamber 381 of the intake muffler 380.

<THIRD VARIANT>

FIGS. 16 and 17 show a third variant.

A muffling chamber 481 of an intake muffler 480 is disposed within the rear upper portion of a cab 408 and is connected in communication with an outlet portion 483 through a communication passage 485 provided along a left guard member 411. The outlet portion 483 is connected in communication with a connection pipe 476.

Besides the above-mentioned embodiments and variants, the present invention may be modified as described in the following items of (1) through (11).

(1) Instead of the skid steer type, the loader may be of the type provided with a gear transmission. The booms for the hydraulic working device may be pivotally mounted to the intermediate portion or to the fore portion of the loader body. Further, the working attachment may be directly driven by means of operation arms supported by the fore portion of the body.

(2) Instead of the diesel engine, the liquid-cooled internal combustion engine may be a gasoline engine, a gas engine and the like.

(3) The cooling fan for the first radiator for cooling the engine cooling liquid may be of the radial type. In this case, the cooling fan can be readily disposed in any space within the engine room, and the fan delivery port may be communicated with the front side of the first radiator through a duct.

(4) The fan driving means comprises an electric motor to be driven by means of a dynamo as an accessory of the engine or a battery.

(5) The second radiator for cooling the working oil may be detachably secured to the engine room wall instead of the upper cover member.

(6) The first radiator for cooling the engine cooling liquid may be so disposed as to face the upper maintenance opening as well as the second radiator for cooling the working oil may be so disposed as to face the rear maintenance opening.

(7) The fore maintenance opening of the hydraulic transmission room and the cover plate projected from the lower surface of the cab may be cancelled.

(8) The driver seat of the cab may be fixedly secured to the main frames and only the head guard may be pivoted.

(9) Since both the rear cover member and the upper cover member of the engine room wall are only required to cover the rear maintenance opening and the upper maintenance opening so as to be opened and closed thereby, they may be of the slide type or of the detachable type.

(10) The upper cover member and the rear cover member may be integrately formed as one member. (11) The upper maintenance opening and the rear maintenance opening may be separately formed so as not to communicate with each other.

As many different embodiments of the invention will be obvious to those skilled in the art, some of which have been disclosed or referred to herein, it is to be understood that the specific embodiments of the invention as presented herein are intended to be way of illustration only and are not limiting on the invention, and it is to be understood that such embodiments, changes or modifications may be made without departing from the spirit and scope of the invention as set forth in the claims appended hereto.

What is claimed is:

1. In a loader including a body composed of a fore portion and a rear portion, a working attachment of a hydraulic working device so supported by the body as to project to the outside space in front of the body, a cab disposed in the foreside portion of the body and an engine room disposed in the rear side portion of the body, the improvement comprising:

an engine room wall which partitions said engine room from the outside space comprising an upper wall portion, a lower wall portion, a left wall portion, a right wall portion, a fore wall portion and a rear wall portion;

said engine room accommodating a liquid-cooled internal combustion engine, a first radiator for cooling an engine cooling liquid, a cooling fan, a fan driving means and a second radiator or cooling a working oil;

an upper maintenance opening being formed in said upper wall portion of the engine room wall;

an upper cover member being provided with an air-induction port and covering said upper maintenance opening so as to open and close it;

a rear maintenance opening being formed in the rear wall portion of the engine room wall;

a rear cover member being provided with an air-discharge port and covering said rear maintenance opening so as to open and close it;

one of both said radiators being so disposed as to face the rear maintenance opening, and the other radiator being so disposed as to face the upper maintenance opening; and when said cooling fan being driven by the fan driving means, the atmosphere in the upper space outside the engine room being sucked into the engine room from said air-induction port of the upper cover member and being discharged outside the engine room from said air-discharge port of the rear cover member after passing through the other radiator, the cooling fan and the one radiator in order.

2. A loader as defined in claim 1, wherein
said first radiator is so disposed as to face the rear maintenance opening, and said second radiator is so disposed as to face the upper maintenance opening.

3. A loader as defined in claim 2, wherein
said cooling fan is of the axial type and is so disposed as to face the first radiator from foreside.

4. A loader as defined in claim 2, wherein
said upper cover member for the upper maintenance opening is pivotally supported by the upper wall portion so as to be changed over between its closed position in which it is pivoted downward and its opened position in which it is pivoted upward, and said second radiator is fixedly secured to the upper cover member.

5. A loader as defined in claim 4, wherein
said upper wall portion of the engine room wall has a fore portion, and said upper cover member has a fore portion, and
the fore portion of the upper cover member is vertically pivotally supported by the fore portion of the upper wall portion.

6. A loader as defined in claim 4, wherein said upper cover member is provided with an upper surface plate, a lower surface plate and a sound-absorbing chamber formed between both these plates.

an air-induction port is formed in the upper surface plate, and the second radiator is fixedly secured to the lower surface, and when said cooling fan is driven by the fan driving means, the atmosphere sucked from the air-induction port is supplied to the second radiator after passing through the sound-absorbing chamber.

7. A loader as defined in claim 3, wherein said engine has a crankshaft extending in the fore and rear direction and is disposed in the foreside around the center portion of the engine room in the left and right direction, said axial cooling fan has an input shaft projecting forward, and the rear end portion of the crankshaft is interlockingly connected to the input shaft of the cooling fan through the fan driving means of the wrapping connector transmission type.

8. A loader as defined in claim 7, wherein there are provided an air cleaner and an exhaust muffler within the engine room, said air cleaner is disposed in the upper portion of one of the left and right spaces outside the engine so as to extend in the fore and rear direction, and the exhaust muffler is disposed in the midway height portion of the other one of the left and right outside spaces so as to extend in the fore and rear direction.

9. In a loader including a body composed of a fore portion and a rear portion, a working attachment of a hydraulic working device so supported by the body as to project to the outside space in front of the body, cab disposed in the foreside portion of the body, and an engine room disposed in the rear side portion of the body, the improvement comprising:

said cab having a rear surface member and being supported by the body so as to be changed over between a driving position in which it is pivoted forward and downward and a maintenance position in which it is pivoted rearward and upward;

an engine room wall which partitions said engine room from the outside space, having a fore wall portion;

a fore maintenance opening being formed in said fore wall portion and being covered so as to be opened and closed by means of said rear surface member of the cab;

said engine room accommodating a liquid-cooled internal combustion engine, a first radiator for cooling an engine cooling liquid and an air cleaner;

said air cleaner being provided with an air-induction pipe having an inlet portion, and said inlet portion of the air-induction pipe being fixedly secured to the body;

an intake muffler connected to said air cleaner having a muffling chamber, an inlet portion and an outlet portion and being fixedly secured to the pivoting portion of the cab;

when said cab being changed over to the driving position on the fore and lower side, the oulet portion of the intake muffler being air-tightly connected in communication with the inlet portion of the air-induction pipe; and to the contrary, when the cab being changed over to the maintenance position on the rear and upper side, the intercommunication between the outlet portion of the intake muffler and the inlet portion of the air-induction pipe being cancelled.

10. A loader as defined in claim 9, wherein said engine room accommodates a second radiator for cooling a working oil, an upper maintenance opening and a rear maintenance opening are formed in said engine room wall, said upper maintenance opening is so covered as to be opened and closed by means of the upper cover member, and said rear maintenance opening is so covered as to be opened and closely by means of the rear cover member, and said first radiator is so disposed as to face the rear maintenance opening, and said second radiator is so disposed as to face the upper maintenance opening.

11. A loader as defined in claim 10, wherein said cab is provided with a head guard having left and right guard members and a ceiling member, and said rear surface member is fixedly secured to the left and right guard members.

12. A skid steer loader including a body composed of a fore portion and a rear portion, a working attachment of a hydraulic working device so supported by the body as to project to the outside space in front of the body, a cab disposed in the foreside portion of the body, an engine room disposed in the rear side portion of the body and a hydraulic transmission room disposed below the cab, the improvement comprising:

said cab having a lower surface member, a rear surface member and a seat fixedly secured to the lower surface member and being supported by the body so as to be changed over between a driving position in which it is pivoted forward and downward and a maintenance position in which it is pivoted rearward and upward;

an engine room wall which partitions said engine room from the outside space, comprising an upper wall portion, a lower, wall portion, a left wall portion, a right wall portion, a fore wall portion and a rear wall portion;

said engine room accommodating a liquid-cooled internal combustion engine, a first radiator for cooling an engine cooling liquid, a cooling fan, a fan driving means and a second radiator for cooling a working oil;

an upper maintenance opening being formed in said upper wall portion of the engine room wall and being so covered as to be opened and closed by means of an upper cover member;

a rear maintenance opening being formed in said rear wall portion of the engine room wall and being so covered as to be opened and closed by means of a rear cover member;

a fore maintenance opening being formed in said fore wall portion of the engine room wall and being so covered as to be opened and closed by means of said rear surface member of the cab;

said hydraulic transmission room being partitioned by means of a transmission room wall from the outside space; and a maintenance opening of the hydraulic transmission room being formed in at least the upper portion of the transmission room wall and being so covered as to be opened and closed by means of said lower surface member of the cab.

13. A loader as defined in claim 12, wherein
said maintenance opening of the hydraulic transmission room comprising an upper opening and a fore opening;
said lower surface member of the cab being provided with a lower surface plate and a cover plate projecting downward from the fore portion of the lower surface plate; and
said upper opening being so covered as to be opened and closed by means of the lower surface plate, and said fore opening being so covered as to be opened and closed by means of the cover plate.

14. A loader as defined in claim 12, wherein
said cab being provided with a head guard having left and right guard members and a ceiling member, and said lower surface member and said rear surface member being fixedly secured to said left and right guard members.

15. A loader as defined in claim 12, wherein
said engine accommodated within the engine room has a crankshaft extending in the fore and rear direction and being disposed in the foreside portion around the center portion of the engine room in the left and right direction,
a hydraulic pump accommodated within said hydraulic transmission room has an input shaft extending rearward, and
the fore portion of said crankshaft is interlockingly connected to the input shaft of the hydraulic pump.

16. A loader as defined in claim 15, wherein
there are provided an air cleaner and exhaust muffler within said engine room,
said air cleaner is disposed in the upper portion of one of the left and right spaces outside the engine so as to extend in the fore and rear direction, and
said exhaust muffler is disposed in the midway height portion of the other one of the left and right outside spaces so as to extend in the fore and rear direction.

17. A loader as defined in claim 12, wherein
said cab is provided with left and right paired main frames extending in the fore and rear direction and boom-supporting frames projecting upward from the respective rear portions of said main frames,
said engine room is formed along the space between the respective rear portions of both the main frames and the space between both the boom-supporting frames,
said hydraulic transmission room is formed in the space between the fore portions of both main frames,
liquid-tight spaces are formed outside the respective rear portions of both the main frames in the left and right direction, and
a fuel for the engine is stored within one of both the liquid-tight spaces as well as a working oil for the hydraulic working device and the hydraulic transmission is stored within the other liquid-tight space.

* * * * *